US008715373B2

(12) United States Patent
Aradi et al.

(10) Patent No.: US 8,715,373 B2
(45) Date of Patent: May 6, 2014

(54) FUEL COMPOSITION COMPRISING A NITROGEN-CONTAINING COMPOUND

(75) Inventors: Allen A. Aradi, Glen Allen, VA (US); May Duffield Thomas, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 441 days.

(21) Appl. No.: 11/775,415

(22) Filed: Jul. 10, 2007

(65) Prior Publication Data

US 2009/0013589 A1 Jan. 15, 2009

(51) Int. Cl.

| | |
|---|---|
| ***C10L 1/223*** | (2006.01) |
| ***C10L 1/12*** | (2006.01) |
| ***C10L 10/10*** | (2006.01) |
| ***C10L 1/224*** | (2006.01) |
| *C10L 1/14* | (2006.01) |
| *F23C 99/00* | (2006.01) |
| *F02B 47/04* | (2006.01) |

(52) U.S. Cl.

CPC ................. *C10L 1/223* (2013.01); *C10L 1/224* (2013.01); *C10L 1/12* (2013.01); *C10L 10/10* (2013.01); *C10L 1/14* (2013.01); *C01L 1/305* (2013.01); *F23C 99/00* (2013.01); *F02B 47/04* (2013.01)

USPC ................... 44/359; 44/354; 44/361; 44/415; 44/603; 44/358; 110/341; 123/1 A

(58) Field of Classification Search

CPC ........... C10L 1/224; C10L 1/223; C10L 1/14; C10L 1/305; C10L 1/12; C10L 10/10; F23C 99/00; F02B 47/04

USPC ........... 44/329, 389, 316, 424, 359, 354, 361, 44/412, 603, 358; 525/535; 110/341; 123/1 A

See application file for complete search history.

(56) References Cited

U.S. PATENT DOCUMENTS

| | | | | |
|---|---|---|---|---|
| 2,818,417 A | | 12/1957 | Brown et al. | |
| 3,127,351 A | | 3/1964 | Brown et al. | |
| 3,622,519 A | * | 11/1971 | Braxton, Jr. | 44/389 |
| 4,238,585 A | * | 12/1980 | Bertozzi | 525/535 |
| 4,568,357 A | | 2/1986 | Simon | |
| 4,674,447 A | | 6/1987 | Davis | |
| 4,695,293 A | * | 9/1987 | Kessler | 44/316 |
| 5,113,803 A | | 5/1992 | Hollrah et al. | |
| 5,599,357 A | | 2/1997 | Leeper | |
| 5,679,116 A | * | 10/1997 | Cunningham et al. | 44/359 |
| 5,944,858 A | | 8/1999 | Wallace | |
| 2002/0134006 A1 | * | 9/2002 | Malfer et al. | 44/424 |
| 2005/0229479 A1 | * | 10/2005 | Fernandes | 44/329 |

FOREIGN PATENT DOCUMENTS

| | | | | |
|---|---|---|---|---|
| CN | 1218096 | | | 6/1999 |
| EP | 466512 | B1 | | 6/1994 |
| FR | GB 851587 | A | | 10/1960 |
| FR | 1255840 | A | | 3/1961 |
| GB | 339637 | A | | 12/1930 |
| GB | 530597 | | | 12/1940 |
| GB | 909243 | | | 10/1962 |
| GB | 911491 | | | 11/1962 |
| RU | 2009176 | | | 3/1994 |
| RU | 2009176 | C1 | | 3/1994 |
| RU | 2129141 | | | 4/1999 |
| RU | 2129141 | C1 | | 4/1999 |
| RU | 2276683 | | | 5/2006 |
| RU | 2276683 | C1 | | 5/2006 |
| WO | 9744413 | | | 11/1997 |
| WO | WO 2004089528 | A2 | | 10/2004 |
| WO | 2005087901 | | | 9/2005 |
| WO | WO2005087901 | | * | 9/2005 |
| WO | WO 2005087901 | A | | 9/2005 |

OTHER PUBLICATIONS evironmentalchemistry.com (2004).*

Brown et al., "Mechanism of Aromatic Amine Antiknock Action", Industrial and Engineering Chemistry, Oct. 1955,vol. 47, No. 10, pp. 2141-2146.

Database WPI Week 199940; Thomson Scientific, London, GB; AN; 1999-469703; XP002502453; & CN 1 218 096 A (Sun L); Jun. 2, 1999; abstract.

Database WPI Week 200637; Thomson Scientific, London, GB; AN; 2006-360234; XP002502454; & RU 2 276 683 C1 (Ressell GRP Co Ltd); abstract.

Database WPI Week 200025; Thomson Scientific, London, GB; AN; 2000-291572; XP002502455; & RU 2 129 41 C1 (TSP RES PRODN Firm Co Ltd); Apr. 20, 1999; abstract.

Extended European Search Report of Corresponding Application No. EP 11160835.2 dated Aug. 4, 2011.

* cited by examiner

*Primary Examiner* — Prem C Singh
*Assistant Examiner* — Chantel Graham
(74) *Attorney, Agent, or Firm* — Novak Druce Connolly Bove + Quigg LLP

(57) ABSTRACT

A fuel additive concentrate comprising at least one aryl amine; and at least one metal-containing compound is disclosed. In an aspect, the fuel additive concentrate can be synergistic. Fuel composition comprising the fuel additive concentration and methods of combusting the fuel composition are also disclosed. Moreover, methods of enhancing research octane number, increasing fuel economy, and reducing the carbon footprint of a vehicle are also disclosed.

8 Claims, No Drawings

FUEL COMPOSITION COMPRISING A NITROGEN-CONTAINING COMPOUND

FIELD OF THE DISCLOSURE

The present disclosure relates to a fuel additive concentrate comprising at least one nitrogen-containing compound, such as an aryl amine; and at least one metal-containing compound. There is also disclosed a fuel composition comprising the additive concentrate; and a hydrocarbonaceous fuel. The disclosed concentrate can synergistically increase octane number, and fuel economy, while also decreasing carbon footprint.

BACKGROUND OF THE DISCLOSURE

A need exists to deliver combustion improvers to fuels in an efficient and cost effective manner. Combustion improvers can vary widely in cost, physical properties, handling and safety requirements, quality or purity, and efficacy. Thus, for certain applications, customers of combustion improvers desire to improve, that is, reduce their costs and, if possible, decrease the amount of combustion improvers.

Fuels and fuel blends that utilize combustion improvers have included diesel fuel, jet fuel, gasoline, biodiesel, coal and other hydrocarbonaceous materials. The combustion improvers have included a variety of accelerants, ignition improvers, octane improvers, cetane improvers, smoke reducers, slag reducers, oxidation catalysts, catalytic converter protectors, and the like.

One way to improve the research octane number (RON) is to utilize aryl amines. For example, n-methylaniline at concentrations of about 0.5% (5000 mg/L) can typically raise the RON by about 0.9, and n-methyl-p-toluidine (NMPT) by about 1 RON at the same treat level. Moreover, metal-based additives, such as methylcyclopentadienyl manganese tricarbonyl (MMT) can raise gasoline RON by about 1.7 at low treat levels of 0.0008% (8 mg Mn/L). Some modern vehicles with knock sensors have been shown to take advantage of fuel RON to optimized combustion in a way that yields a corresponding fuel economy benefit. Therefore any synergistic increase in RON by additive combinations can be important for fuel economy resulting in a reduction in the carbon footprint resulting from burning fossil gasoline in internal combustion engines.

SUMMARY OF THE DISCLOSURE

In accordance with the disclosure, there is disclosed a fuel additive concentrate comprising at least one aryl amine; and at least one metal-containing compound.

Moreover, there is also disclosed a synergistic fuel additive concentrate comprising: at least one aryl amine; and at least one metal-containing compound.

A method for combusting a metal-containing compound in an engine comprising (a) combining at least one aryl amine and at least one metal-containing compound, (b) introducing the combination from (a) into a fuel, and (c) causing the fuel from (b) to be combusted in the engine is also disclosed.

In an aspect, there is disclosed a method for enhancing research octane number of gasoline comprising (a) combining at least one aryl amine; and at least one metal-containing compound, and (b) adding said combination to the gasoline.

There is also disclosed a blend of combustion improvers useful for optimizing octane response of a fuel comprising mixtures of two or more materials selected from the group consisting of aryl amines, organometallic cyclomatic manganese tricarbonyls, MMT/CMT, MMT/R—$Mn(CO)_5$ where R is an aryl- or alkyl-radical species; mixed metal organometallics of Mn/Fe, Mn/Ce, Mn/Pt, Mn/Platinum-group metals, Mn/Cu, Fe/Ce, Fe/Platinum-group metals, Fe/Cu, Mn/Pb, Fe/Pb, Ce/Pb, and Pb/Platinum-group metals.

In an aspect, there is disclosed a method for solubilizing a solid fuel additive in a hydrocarbonaceous fuel, said method comprising combining, in any order, at least one solid fuel additive, at least one aryl amine, and a hydrocarbonaceous fuel.

In a further aspect, there is disclosed a method for combusting a metal-containing compound in a combustion system comprising (a) combining at least one aryl amine and at least one metal-containing compound, (b) introducing the combination from (a) into a fuel, and (c) causing the fuel from (b) to be combusted in the combustion system; wherein the combustion system is chosen from utility and industrial burners, boilers, furnaces, and incinerators.

There is also disclosed a method for synergistically enhancing research octane number of gasoline comprising (a) combining at least one aryl amine; and at least one metal-containing compound, and (b) adding said combination to the gasoline.

In another aspect, there is disclosed a method for increasing fuel economy in a vehicle, comprising: providing to a vehicle a fuel composition comprising at least one metal-containing compound, and at least one aryl amine.

Further, there is disclosed a method for reducing the carbon footprint of a vehicle comprising: providing to a vehicle a synergistic fuel composition comprising at least one metal-containing compound, and at least one aryl amine.

Additional objects and advantages of the disclosure will be set forth in part in the description which follows, and/or can be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

DESCRIPTION OF THE EMBODIMENTS

The present disclosure is directed to an additive concentrate comprising at least one nitrogen-containing compound; and at least one metal-containing compound. The additive concentrate can be a synergistic additive concentrate. Moreover, there is disclosed a fuel composition comprising the additive concentrate and a hydrocarbonaceous fuel. The fuel composition containing the additive concentrate can exhibit at least one of the following properties: increase research octane number, increased fuel economy, and decreased carbon footprint, relative to a comparable fuel composition without the additive concentrate.

The disclosed nitrogen-containing compound for use in the additive concentrate can be any aryl amine. In an aspect, the aryl amine can be in the form of a liquid. The aryl amine can be selected from the group consisting of n-methylaniline; n-methyl-p-toluidine; N-arylphenylenediamines, such as N-phenylphenylenediamines, for example, N-phenyl-1,4-phenylenediamine, N-phenyl-1,3-phenylenediamine, and N-phenyl-1,2-phenylenediamine, and N,N'-di-sec-butyl-phenylenediamine; 4-isopropylaminodiphenylamine; phenyl-α-naphthyl amine, ring-alkylated diphenylamines, and mixtures thereof.

The disclosed nitrogen-containing compound can be present in the fuel composition at a treat rate ranging from about 0.01 to about 5%, for example from about 0.02 to about 3% by weight, relative to the total weight of the composition. In an aspect, the nitrogen-containing compound can be present in the fuel composition at a treat rate of about 100 mg/L to about 10000 mg/L, for example from about 200 mg/L to about 7000 mg/L, and as a further example from about 250 mg/L to about 5000 mg/L. The additive concentrate can also comprise a metal-containing compound. The metal-containing compound can include any compound comprising at least one metal atom, such as a manganese atom.

The metal-containing compound can be in the form of a solid or a liquid. In an aspect, methylcyclopentadienyl manganese tricarbonyl (MMT) has been found to be an excellent solvent for cyclopentadienyl manganese tricarbonyl (CMT), which is a crystalline powder. Moreover, the disclosed nitrogen-containing compounds can also be used as a solvent for solid metal-containing fuel additives, such as CMT or ferrocene. Thus, the additive formulations of the present disclosure can be liquids.

In an aspect, the metal-containing compound can be selected from the group consisting of cyclopentadienyl manganese tricarbonyl; ferrocene; compounds derived from platinum-group metals, cerium, copper, cobalt, tungsten, molybdenum, lanthanum, calcium, iron, palladium, and barium, and mixtures thereof.

In an aspect, the metal-containing compound can be in the form of a liquid. For example, the metal-containing compound can be a liquid manganese-containing compound. Manganese-containing organometallic compounds can include, for example, manganese tricarbonyl compounds. Such compounds are taught, for example, in U.S. Pat. Nos. 4,568,357; 4,674,447; 5,113,803; 5,599,357; 5,944,858 and European Patent No. 466 512 B1, the disclosures of which are hereby incorporated in their entirety.

Suitable manganese tricarbonyl compounds which can be used include, but are not limited to, cyclopentadienyl manganese tricarbonyl, methylcyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganese tricarbonyl, diethylcyclopentadienyl manganese tricarbonyl, propylcyclopentadienyl manganese tricarbonyl, isopropylcyclopentadienyl manganese tricarbonyl, tert-butylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and the like, including mixtures of two or more such compounds. One example is the cyclopentadienyl manganese tricarbonyls which can be liquid at room temperature such as methylcyclopentadienyl manganese tricarbonyl, ethylcyclopentadienyl manganese tricarbonyl, liquid mixtures of cyclopentadienyl manganese tricarbonyl and methylcyclopentadienyl manganese tricarbonyl, mixtures of methylcyclopentadienyl manganese tricarbonyl and ethylcyclopentadienyl manganese tricarbonyl, etc. Metal-containing compound derivatives do not need to be liquid, because in cases where they are solids, one can choose a liquid arylamine to act as a solvent. And in cases where the arylamines are solids, one can choose a liquid metal-containing compound to be the solvent. If possible it is always advantageous to have the additive formulation in liquid form to facilitate blending into fuels.

Preparation of such compounds is described in the literature, for example, U.S. Pat. No. 2,818,417, the disclosure of which is incorporated herein in its entirety.

Non-limiting examples of manganese-containing compounds include non-volatile, low cluster size (1-3 metal atoms) manganese-containing compounds such as bis-cyclopentadienyl manganese, bis-methyl cyclopentadienyl manganese, manganese naphthenate, manganese II citrate, etc, that are either water or organic soluble. Further examples include, but are not limited to, non-volatile, low cluster manganese-containing compounds embedded in polymeric and/or oligomeric organic matrices such as those found in the heavy residue from the column distillation of crude MMT.

In an aspect, the at least one metal-containing compound can be present at a treat rate of 8 mg metal/liter of fuel, In an aspect, the at least one metal-containing compound can be present at a treat rate of about 0.5 to about 64 mg metal/liter fuel, for example from about 2 to about 32 mg metal/liter fuel, and as a further example from about 4 to about 18 mg metal/liter fuel.

The additive concentrate can comprise two or more metal-containing compounds. For example, the concentrate can comprise a solid form of CMT and a liquid form of MMT, wherein the CMT would solubilize. As a further example, the concentrate can comprise CMT or MMT and ferrocene. It has been found that additive concentrates comprising MMT and a secondary metal-containing compound, wherein the secondary metal-containing compound is not MMT, exhibit several types of unexpected synergy. In an aspect, the secondary metal-containing compound is an organometallic compound.

There is also disclosed a method for combusting a metal-containing compound in an engine comprising; (a) combining at least one nitrogen-containing compound and at least one metal-containing compound, (b) introducing the combination from (a) into a fuel, and (c) causing the fuel from (b) to be combusted in the engine. The term "causing" as used herein is understood to include the expectation, knowledge or intent to thereby facilitate the eventual combustion of the fuel containing the at least one nitrogen-containing compound and at least one metal-containing compound.

It is believed, without being limited to any particular theory, that blends for use in the present fuel composition can include binary mixtures of organometallic cyclomatic manganese tricarbonyls, MMT/CMT, MMT/R—$Mn(CO)_5$ where R can be aryl- or alkyl-radical species; mixed metal organometallics where the mixed metal components are selected from Mn/Fe, Mn/Ce, Mn/Pt, Mn/Platinum-group metals, Mn/Cu, Fe/Ce, Fe/Platinum-group metals, Fe/Cu, Mn/Pb, Fe/Pb, Ce/Pb, Pb/Platinum-group metals, etc, and ternary and higher order of mixed metal combinations.

The term "enhanced" as used herein means an improvement in the octane performance of a fuel composition relative to a similar fuel composition that does not have a synergistic eutectic mixture.

The disclosed fuel composition can comprise a hydrocarbonaceous fuel. By "hydrocarbonaceous fuel" herein is meant hydrocarbonaceous fuels such as, but not limited to, diesel fuel, jet fuel, alcohols, ethers, kerosene, low sulfur fuels, synthetic fuels, such as Fischer-Tropsch fuels, biomass to liquids (BTL) fuels, coal to liquids (GTL) fuels, gas to liquids (GTL) fuels, liquid petroleum gas, fuels derived from coat, genetically engineered biofuels and crops and extracts therefrom, natural gas, propane, butane, unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds, fuels with mixtures of different volatility oxygenates to modulate the volatility of the bulk fuel. Oxygenates suitable for use in the fuels of the present disclosure include methanol, ethanol, isopropanol, t-butanol, mixed alcohols, methyl tertiary butyl ether, tertiary amyl methyl ether, ethyl tertiary butyl ether and mixed ethers. Oxygenates, when used, will normally be present in the reformulated gasoline fuel in an amount below about 25% by volume, and for example in an amount that provides an oxygen content in the overall fuel in the range of about 0.5 to about 5 percent by volume. "Hydrocarbonaceous fuel" or "fuel" herein shall also mean waste or used engine or motor oils which may or may not contain molybdenum, gasoline, bunker fuel oil, marine fuel oil, utility and industrial boiler, furnace and burner fuel oils, coal (dust or slurry), crude oil, refinery "bottoms" and by-products, crude oil extracts, hazardous wastes, yard trimmings and waste, wood chips and saw dust, agricultural waste, fodder, silage, plastics and other organic waste and/or by-products, and mixtures thereof, and emulsions, suspensions, and dispersions thereof in water, alcohol, or other carrier fluids. By "diesel fuel" herein is meant one or more fuels selected from the group consisting of diesel fuel, biodiesel, biodiesel-derived fuel, synthetic diesel and mixtures thereof. In an aspect, the hydrocarbonaceous fuel is substantially sulfur-free, by which is meant a sulfur content not to exceed on average about 30 ppm of the fuel.

The disclosed fuel compositions can be combusted in an engine, such as a spark ignition engine or compression ignition engine, for example, advanced spark ignition and compression ignition engines with and without catalyzed exhaust after treatment systems with on-board diagnostic ("OBD") monitoring. To improve performance, fuel economy and emissions, advanced spark ignition engines may be equipped with the following: direct injection gasoline (DIG), variable valve timing (WT), external exhaust gas recirculation (EGR), internal EGR, turbocharging, variably geometry turbocharging, supercharging, turbocharging/supercharging, multi-hole injectors, cylinder deactivation, and high compression ratio. The DIG engines may have any of the above including spray-, wall-, and spray/wall-guided in-cylinder fuel/air charge aerodynamics. More advanced DIG engines in the pipeline will be of a high compression ratio turbocharged and/or supercharged and with piezo-injectors capable of precise multipulsing of the fuel into the cylinder during an injection event. Exhaust after treatment improvements will include a regeneratable $NO_x$ trap with appropriate operation electronics and/or a NOx catalyst. The advanced DIG engines described above will be use in gasoline-electric hybrid platforms.

For compression ignition engines, there will be advanced emissions after treatment such as oxidation catalyst, particulate trap (PT), catalyzed PT, $NO_x$ trap, on-board $NO_x$ additive (i.e. urea) dosing into the exhaust to remove $NO_x$, and plasma reactors to remove NOx. On the fuel delivery side common rail with piezo-activated injectors with injection rate-shaping software can be used. Ultra-high pressure fuel injection (from 1800 Bar all the way to 2,500 Bar), EGR, variable geometry turbocharging, gasoline homogeneous charge compression ignition (HCCl) and diesel HCCl. Gasoline- and diesel-HCCl in electric hybrid vehicle platforms can also be used.

The term "after treatment system" is used throughout this application to mean any system, device, method, or combination thereof that acts on the exhaust stream or emissions resulting from the combustion of a diesel fuel. "After treatment systems" include all types of diesel particulate filters—catalyzed and uncatalyzed, lean $NO_x$ traps and catalysts, select catalyst reduction systems, $SO_x$ traps, diesel oxidation catalysts, mufflers, $NO_x$ sensors, oxygen sensors, temperature sensors, backpressure sensors, soot or particulate sensors, state of the exhaust monitors and sensors, and any other types of related systems and methods.

In an aspect, the nitrogen-containing compound and the metal-containing compound can be combined and introduced into a fuel, and causing the fuel to be combusted in an engine.

The disclosed blend can also be combusted in other systems, such as those of atmospheric combustion used in utility and industrial burners, boilers, furnaces, and incinerators. These systems can burn from natural gas to liquid fuels (#5 fuel oil and heavier), to solid fuels (coals, wood chips, burnable solid wastes, etc).

In another aspect, there is disclosed a method for solubilizing a solid fuel additive in a hydrocarbonaceous fuel, by combining, in any order, the solid fuel additive, a metal-containing compound, and a hydrocarbonaceous fuel. Thus, the solid fuel additive can be dissolved, dispersed, melted or otherwise mixed into or combined with the metal-containing compound under conditions of time, temperature and pressure sufficient to solubilize the solid fuel additive in the liquid metal-containing compound. In another aspect, the metal-containing compound can be added to the solid fuel additive to achieve similar solubilization of the solid fuel additive. In yet another aspect of the present disclosure, the solid fuel additive and metal-containing additive can be added simultaneously or sequentially to the hydrocarbonaceous fuel, such as diesel or gasoline fuel, for example, under conditions sufficient to achieve the desired solubilization. For maximum benefit, a blend of solid fuel additive and metal-containing compound can be blended first then added to the fuel.

There is also disclosed a method of enhancing research octane number of gasoline comprising (a) combining at least one nitrogen-containing compound; and at least one metal-containing compound; and (b) adding said combination to the gasoline. Moreover, there is a method of synergistically enhancing research octane number of gasoline.

A further aspect of the present disclosure is the presence or occurrence, whether inadvertent or not, of CMT resulting in or from the production of MMT. Such presence might occur as a result of impurities (cyclopentadiene dimer or monomer) in the raw material methylcyclopentadiene used to make MMT, and some of this impurity can then associate with a manganese atom with subsequent carbonylation to form CMT. As an example, there can be by this process easily an amount of 1.5% by weight CMT in the MMT. The resulting mix of MMT and CMT has the CMT solubilized in the MMT, whereby the CMT can be readily mixed with a fuel.

One benefit of this embodiment is a potential cost reduction by utilizing as much of the lower cost CMT as desired in a fuel additized with MMT. No detrimental effect on the fuel or its combustion is noted, nor is the engine adversely affected.

Further, there is disclosed a method of increasing fuel economy or reducing the carbon footprint of a vehicle, comprising providing to the vehicle the disclosed fuel composition.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as formation of the organometallic compound) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations or immediately thereafter is thus wholly immaterial for an accurate understanding and appreciation of this disclosure and the claims thereof.

EXAMPLES

Octane responses of the various gasoline blends were determined on the ASTM-CFR test engine. The research octane number (RON) of each fuel was determined using the ASTM D2699 method and the motor octane number (MON) by the ASTM D2700 method. Fuel compositions containing various additive concentrations, as shown in Tables 1 and 2, were tested for octane response in regular unleaded gasoline (RUL), at equal manganese levels. FIG. 1 summarizes the resultant octane changes. FIG. 1 shows the change in octane number by the different formulations.

TABLE 1

Change in RON

| | Mg/Metal/L | | | |
|---|---|---|---|---|
| | 4 mg/L | 8 mg/L | 18 mg/L | 32 mg/L |
| CMT | 1.1 | 1.7 | 2.2 | 2.8 |
| MMT | 0.9 | 1.7 | 2.5 | 3 |
| Ferrocene | 0.9 | 1.2 | 2 | 2.3 |
| CMT/Ferrocene | 1 | 1.4 | 2.1 | 2.6 |
| MMT/Ferrocene | 0.6 | 1.6 | 2.3 | 2.6 |
| CMT/NMPT | | 3.5 | | |
| MMT/NMPT | | 3.4 | | |
| Ferrocene/NMPT | | 2.6 | | |
| CMT/Ferrocene/NMPT | | 3.2 | | |
| MMT/Ferrocene/NMPT | | 3.3 | | |

The data in Table 2 shows the exact synergy realized by the different formulations. The numbers in the first column were obtained by subtracting the RON response of the metal-containing additive at 8 mg Metal/L from each respective NMPT/meta-containing additive combination. So, for example, from Table 1 CMT/NMPT (3.5) minus CMT (1.7) equals 1.8. The numbers in the second column shows the synergistic boost in RON by taking the data in column 1 and subtracting the RON of NMPT alone in the fuel at 5000 mg/L. For example, the delta RON for CMT/NMPT (1.8) minus NMPT alone (1.4) equals 0.4 The third column of data in Table 2 shows the percent RON boost imparted to the NMPT by the metal-containing additive(s). CMT and MMT at a treat rate of 8 mg Mn/L boost the RON of NMPT by 29 and 21%, respectively. This same RON boost is realized when the Mn in CMT and MMT is dropped by a half to 4 mg Mn/L (formulations CMT/ferrocene/NMPT and MMT/ferrocene/NMPT), showing that the synergistic boost is Mn concentration independent. Ferrocene alone did not impart any synergistic RON boost to NMPT. The RON of the base fuel is 91.4.

TABLE 2

Synergistic RON Boost of NMPT by metal-containing additive(s)

| 5000 mg/L | Delta RON | Synergistic Boost in RON | Percent RON boost |
|---|---|---|---|
| CMT/NMPT | 1.8 | 0.4 | 29 |
| MMT/NMPT | 1.7 | 0.3 | 21 |
| Ferrocene/NMPT | 1.4 | 0 | 0 |
| CMT/Ferrocene/NMPT | 1.8 | 0.4 | 29 |
| MMT/Ferrocene/NMPT | 1.7 | 0.3 | 21 |
| NMPT alone | 1.4 | | |

At numerous places throughout this specification, reference has been made to a number of U.S. patents, published foreign patent applications and published technical papers. All such cited documents are expressly incorporated in full into this disclosure as if fully set forth herein.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Applicant does not intend to dedicate any disclosed embodiments to the public, and to the extent any disclosed modifications or alterations may not literally fall within the scope of the claims, they are considered to be part of the invention under the doctrine of equivalents.

What is claimed is:

1. A fuel additive concentrate comprising:

from about 99.36% to about 99.92% by weight of at least one aryl amine; and at least one metal-containing compound selected from the group consisting of a manganese-containing organometallic compound, and ferrocene.

2. The concentrate of claim 1, wherein the aryl amine is selected from the group consisting of n-methylaniline, n-methyl-p-toluidine N-arylphenylenediamine, 4-isopropylaminodiphenylamine, toluidine, phenyl-α-naphthyl amine, and ring-alkylated diphenylamine.

3. The concentrate of claim 1, wherein the metal-containing compound is selected from the group consisting of cyclopentadienyl manganese tricarbonyl, and ferrocene.

4. The concentrate of claim 1, wherein the metal-containing compound is in the form of a liquid.

5. The concentrate of claim 1, wherein the manganese-containing organometallic compound is selected from the group consisting of cyclopentadienyl manganese tricarbonyl, dimethylcyclopentadienyl manganese tricarbonyl, trimethylcyclopentadienyl manganese tricarbonyl, tetramethylcyclopentadienyl manganese tricarbonyl, pentamethylcyclopentadienyl manganese tricarbonyl, ethylcyclopentadienyl manganesetricarbonyl, diethylcyclopentadienyl manganese tricarbonyl, propylcyclopentadienyl manganese tricarbonyl, isopropylcyclopentadienyl manganese tricarbonyl, tertbutylcyclopentadienyl manganese tricarbonyl, octylcyclopentadienyl manganese tricarbonyl, dodecylcyclopentadienyl manganese tricarbonyl, ethylmethylcyclopentadienyl manganese tricarbonyl, indenyl manganese tricarbonyl, and mixtures thereof.

6. The concentrate of claim 1, wherein the metal-containing compound is methylcyclopentadienyl manganese tricarbonyl.

7. The concentrate of claim 1, wherein the at least one aryl amine is n-methyl-p-toluidine and the metal-containing compound is methylcyclopentadienyl manganese tricarbonyl.

8. The concentrate of claim 1, wherein the at least one aryl amine is selected from the group consisting of n-methyl-p-toluidine, n-arylphenylenediamine, 4-isopropylaminodiphenylamine, phenyl-a-naphthylamine, and ring-alkylated diphenylamines.

* * * * *